United States Patent
Whelan et al.

(10) Patent No.: US 7,213,022 B2
(45) Date of Patent: May 1, 2007

(54) ENTERPRISE CONTENT MANAGEMENT NETWORK-ATTACHED SYSTEM

(75) Inventors: Daniel S. Whelan, Dana Point, CA (US); Charles R. Fay, Newport Beach, CA (US)

(73) Assignee: Filenet Corporation, Costa Mesa, CA (US)

( * ) Notice: Subject to any disclaimer, the term of this patent is extended or adjusted under 35 U.S.C. 154(b) by 386 days.

(21) Appl. No.: 10/834,100

(22) Filed: Apr. 29, 2004

(65) Prior Publication Data
US 2005/0246311 A1 Nov. 3, 2005

(51) Int. Cl.
G06F 17/00 (2006.01)
G06F 12/00 (2006.01)
G06F 7/00 (2006.01)

(52) U.S. Cl. .............................. 707/10; 707/3; 707/204
(58) Field of Classification Search ................ 707/10, 707/204, 3; 710/1; 713/200; 709/229
See application file for complete search history.

(56) References Cited

U.S. PATENT DOCUMENTS

| | | | |
|---|---|---|---|
| 4,608,679 A | 8/1986 | Rudy et al. | |
| 4,675,856 A | 6/1987 | Rudy et al. | |
| 4,685,095 A | 8/1987 | Rudy et al. | |
| 6,141,754 A * | 10/2000 | Choy | 726/1 |
| 6,338,074 B1 | 1/2002 | Poindexter et al. | |
| 2002/0059466 A1 | 5/2002 | Poindexter et al. | |
| 2003/0046369 A1 * | 3/2003 | Sim et al. | 709/220 |
| 2004/0117358 A1 * | 6/2004 | von Kaenel et al. | 707/3 |
| 2004/0193740 A1 * | 9/2004 | Kasmirsky et al. | 710/1 |
| 2005/0044197 A1 * | 2/2005 | Lai | 709/223 |

OTHER PUBLICATIONS

"Business Process Manager", FileNet product brochure, no date, (6 pages).
"Content Manager", FileNet product brochure, no date, (6 pages).
"FileNet Business Proces Manager", A Technical White Paper, Aug. 2003 (48 pages).
"FileNet P8 Workplace", FileNet product brochure, no date, (4 pages).

* cited by examiner

Primary Examiner—John Cottingham
Assistant Examiner—Kuen S. Lu
(74) Attorney, Agent, or Firm—Janaki K. Davoa; Konrad Raynes & Victor LLP

(57) ABSTRACT

A method and system for providing services in an enterprise content management network attached system are provided, where the enterprise content management functions are provided as an integral part of a storage system. An integrated enterprise content management network attached system provides a single, unified approach to the entire range of enterprise content management functions from storage management to content and business process management. The result is a robust and reliable complete enterprise content management solution with a lower total cost of ownership than existing products.

8 Claims, 7 Drawing Sheets

ENTERPRISE CONTENT MANAGEMENT NETWORK-ATTACHED SYSTEM

BACKGROUND OF THE INVENTION

1. Field of the Invention

The present invention relates generally to enterprise content management systems, and, more particularly, to enterprise content management network-attached systems.

2. Description of the Related Art

Managing electronic files and data is a fact of life for modem business operations. Businesses are becoming increasingly dependent on various electronic content creation and communication tools—such as the word processors, web applications, emails, image and video applications, and various databases, just to name a few—to conduct their business operations.

One consequence of this growing dependence on electronic information and communication tools is wildly proliferating digital data. It is not uncommon these days to find several billion bytes (gigabytes) of data on home computers used for personal purposes. In the business world, having several trillion bytes (terabytes) of data is not unusual, and some of the largest enterprises maintain more than petabytes (million billion bytes) of data on a regular basis. Thus, there exist needs among modern enterprises for systems which can store and manage very large amounts of data. At present, such needs are met by various interconnected storage systems such as the Network Attached Storage (NAS) and Storage Area Networks (SAN). The NAS systems are storage systems connected over existing computer network technologies such as the Ethernet or IP networks. The SAN (Storage Area Networks) systems connect storage systems over dedicated Fiber Channel network connections. Currently, vendors such as EMC and Network Appliance offer various NAS and SAN solutions.

However, being able to store a very large amount of data creates yet another type of problem, as the large quantity of data by its very nature gives rise to the proverbial "needle in the haystack" problem. As the size of the data in the storage grows, the task of finding and retrieving the exact data and information needed for a particular purpose becomes more and more challenging. It is often said that the success of modem enterprises depends on finding the right information for the right person at the right time.

The problem of finding "a needle in the haystack" is compounded by the existence of dissimilar data types which are managed by different applications with different access and/or search methodologies. Some files are managed through conventional file systems, emails are organized and accessed with email applications, and various databases are managed with their own database application programs. Thus, with conventional tools, it is often necessary to search several places with different applications in order to find the right set of information for a given task. In addition, access privilege and security mechanisms are typically quite different across the various content management tools. These problems make the task of "finding the right information for the right person at the right time" difficult for modem enterprises.

In order to address these problems, various Enterprise Content Management (ECM) systems have been introduced. A key component of any content management system is metadata. Metadata is "data about data"—i.e., data or information about a particular item of data. For example, metadata about a document file may be the author, creation time and date, last modified time and date, keywords describing the content of the documents, the file type, the application associated with the file, and access privileges for various users. Content management systems create and manage metadata for each item of data or information entered into the system and maintain a database or repository that contains the metadata. Thus, with a content management system users can locate desired information by searching for relevant attributes or keywords in the metadata database. Utilization of metadata also allows organizing, sorting, and selectively presenting data items based on relevant attributes stored in the associated metadata.

Metadata can be used, however, for much more than organizing, searching, and retrieving information. Since metadata are just another type of data, any information about the content data can be stored in the associated metadata. Stated generally, metadata can contain "intelligence" about the associated item of data. This intelligence can include: applications associated with the data, what operation can be performed on the data, the history of processing on the data, and what processing should be performed next on the data. Thus, metadata can be used to encode the entire life-cycle specifications for the associated content data. Based on such technologies, the capabilities of content management systems can be extended beyond organization and retrieval of information to management of business processes performed on the documents, information, or data. Systems with such capabilities are called Business Process Management (BPM) or Work Flow Management (WFM) systems. The metadata in this context are also called business process data. At present, vendors such as FileNet, IBM, Documentum, and Vignette provide various content management and/or business process management products or services.

One particular area where the content management systems are heavily relied on is so-called "fixed content" systems. In some business environments, enterprises are required to maintain data or records that cannot be modified due to the nature of business or government regulatory requirements. Examples include medical records and diagnostic medical images (such as X-ray and MRI images) for healthcare and insurance industry, accounting records and corporate documents for corporations, and security transaction records for brokerage firms or investment banks. For hospitals and healthcare providers, it is important to maintain X-ray and MRI images that cannot be modified due to concerns about accurate diagnosis and keeping accurate medical histories. Various government regulations such as Sarbanes-Oxley, HIPAA (Health Insurance Portability and Accountability Act), and SEC Rule 17a-4 require corporations, insurance companies, and securities brokers to maintain records that are guaranteed against modification for an extended period of time. For these types of records and data, the storage and content management problems are particularly acute due to the fact that the size of overall data must inevitably grow since the records cannot be deleted or modified and must be kept for an extended period of time. At present, vendors such as FileNet, EMC, and Network Appliance offer various fixed content storage systems, while FileNet, IBM, and Documentum provide content management solutions for enterprise record management needs and compliance requirements.

Despite multitudes of existing products and systems, there exist opportunities for improvements among currently available enterprise information management solutions. One of the shortcomings of existing solutions is lack of integration among various components of enterprise content management and storage systems. For example, as shown in FIG. 1, an enterprise content management system typically comprises several separate component systems: namely, content server cluster (110), content data storage (112), content metadata server cluster (120), content metadata storage (122), business process server cluster (130), and business process data storage (132). An enterprise content management system is typically deployed in a local area network (140) environment, and accessed from workstations (150) or personal computers (160). With existing solutions, these component systems are usually provided by different vendors, and are installed, maintained, and operated separately. In addition, the applications or software that provide the content management and business process management functions operate as distinct components separate from the storage systems.

Since there is currently no single integrated solution that provides the entire spectrum of process management, content management and storage capabilities, the enterprises must integrate various components of the enterprise information management system manually. Often the various components are provided by different vendors. This lack of integration causes several serious problems.

The first is difficulties in system administration including installation, configuration, and upgrade management. Since various components of enterprise information management systems are not aware of each other, they must be installed and configured separately. More often than not, the installation and configuration procedures and tools are quite dissimilar from each other, requiring the operators and administrators to learn and remember the dissimilar procedures and methods. Furthermore, since the configuration information for the entire system is not (and cannot be) maintained by any single component, the system-wide configuration data must be maintained manually through a process that is external to the system, rendering the management of system-wide configuration information an error-prone, complex, and difficult process.

In addition, upgrades of various components of the enterprise system tend to occur in a manner that is completely unrelated to each other, as the components are produced by different companies with entirely unrelated upgrade or product release schedules. This leads to difficult problems of timing upgrades, upgrade synchronization, and system-wide version maintenance and management. In particular, system-wide version information must be maintained, as interaction between different versions of software and/or hardware sometimes can result in unexpected problems which are difficult to track down. However, as was the case for system-wide configuration information, system-wide version information must be maintained external to the system for exactly the same reasons, leading to similar system administration difficulties. Thus, there exists a need in the field for an integrated enterprise content management system with integrated procedures and tools for installation, configuration, upgrade, and version management.

The second type of problems that arises from mixing and matching components from different vendors is dissimilar and incongruent semantics among various system components. Because information systems deal with intangible objects, the design and architecture of an information system are inherently based on abstract concepts. Thus, the "ontology" of an information system—what it is and what it does—is a direct result of the design principles, conceptual building blocks ("primitives"), and architectural framework employed by the system designers and architects. Naturally, there are competing design principles and paradigms, and designers and architects of information systems do not think alike. As a result, information systems from different design teams, e.g., from different vendors, tend to look and operate quite differently from each other. Thus, mixing and matching components from different vendors quite often involve translating and mapping dissimilar objects and concepts across the system boundaries. For example, most enterprise content storage systems offer primitives for storing content data and associated content metadata. However, the semantics of the primitives may not be entirely consistent with the semantics of the enterprise content management or business process management systems that operate on top of the storage primitive layers. Dissimilar and incongruent semantics across the system boundaries can sometimes lead to fundamental system problems with adverse consequences. Often, system-wide instability can be traced to inherent instability in system integration due to inconsistent and incongruent semantics across the system component boundaries.

Furthermore, dissimilar and inconsistent semantics can result in difficulties in system administration, as it is difficult to handle several different semantics and conceptual frameworks at the same time. Consistent semantics, conceptual framework, and design paradigms across the system hierarchy are essential and fundamental requirements for a stable and robust enterprise content management system. Thus, there exists a need in the field for an integrated enterprise content management system that presents a unified paradigm across the system hierarchy with unified and consistent semantics and conceptual framework.

Some enterprises have attempted to address the problem of dissimilar semantics by employing so-called "Content Bridge" technologies. Content bridges, such as Venice-Bridge from Venetica, provide tools to integrate disparate systems by mapping and translating dissimilar logical units, data dictionaries, metaphors, and taxonomy into a single, consistent framework. Although content bridges provide useful tools that can improve the quality of system integration, several problems remain. The first is that some inconsistencies across disparate systems simply cannot be resolved. The second, and a more serious problem is that content bridges do not and cannot address the issues of replication and disaster recovery, since content bridges focus only on the conceptual problems of integrating dissimilar semantics of disparate systems.

For enterprise systems comprising disparate components from different vendors, replication and disaster recovery must be done separately for each component system. However, it is critical that replication and recovery transactions are synchronized across the entire hierarchy of system data layers. From the low-level storage data of NAS and/or SAN storage systems, to the content data, business process data, associated metadata, and the database that maintains the association information, the entire data set must be perfectly synchronized for the system to be operational and replication and recovery be effective. If these subcomponents become "out of sync" from each other, the entire data set may become meaningless, rendering the enterprise system useless. Nevertheless, existing products and technologies do not provide mechanisms to synchronize replication and recovery with external systems. Thus, currently, system-wide synchronization must be performed manually, and, when the replication and recovery transactions become "out of sync",the transactions must be reconciled through a manual process. These are difficult and frustrating processes that are also error-prone.

The problem of replication and recovery synchronization is especially acute for "fixed content" systems discussed above. Because the content data in fixed content systems must be guaranteed against changes while the metadata and association database must be dynamic (i.e., modifiable), the entire data set cannot be stored on the same storage system and backed up together by brute force by "imaging" the entire system. Thus, for currently available fixed content systems, synchronization of replication and recovery must be done manually, with all of the accompanying problems described above.

For enterprise systems, the importance of replication and disaster recovery cannot be over-stated. Because many modem enterprises depend critically on their enterprise information systems, the enterprise content management systems for those organizations must be mission critical, high availability systems. For these systems, system-wide replication and disaster recovery are essential functions in providing high availability capabilities. Even when high availability is not required, replication and disaster recovery are important in order to provide business continuity protection. Replication and disaster recovery are essential functions to ensure reliability and robustness of enterprise systems. Thus, there exists a need in the field for an integrated enterprise content management system that provides synchronized replication and recovery of all of its components including the content management, business process management, and database and content storage management systems.

Another problem that comes from integrating disparate components from different vendors is performance degradation. Typically, integration is achieved by utilizing vendor-provided interface layers. Alternatively, components may be integrated employing third-party integration tools such as the content bridges described above. In either case, performance degradation is inevitable whenever interface layers are introduced to a system, because the system needs to perform extra steps in order to process data through the interfaces or bridges.

It can be seen, then, there is a need for an integrated enterprise content management network attached system that provides a unified approach to the entire range of enterprise content management functions from storage management to content and business process management.

SUMMARY OF THE INVENTION

Accordingly, the present invention addresses the foregoing need by providing an integrated enterprise content management network-attached system that affords a native, unified approach to the entire range of enterprise content management functions from storage management to content and business process management.

According to one aspect of the invention, the present invention is an enterprise content management network-attached system, where a storage system is provided with integral, native content management and business process management functions. According to this aspect of the invention, the present invention is an enterprise content management network-attached system with native integration of a content management system, a business process system, and a storage system, comprising: a storage system for storing content data, content metadata, business process data, and computer executable process steps for content management and business process management, wherein the computer executable process steps for content management and business process management include: (1) steps for accessing the content data, the content metadata, and business process data, and (2) steps for processing the content data in accordance with information contained in the content metadata and business process data.

The present invention also encompasses a native, unified replication system which automatically synchronizes replication of the content data, the content metadata, and the business process data.

According to another aspect of the invention, the present invention is a method of providing services in an enterprise content management network-attached system, where the content management and business process management functions are provided as an integral, native extension of a storage system. According to this aspect of the invention, the present invention is a method of providing services in an enterprise content management network-attached system with native integration of a content management system, a business process system, and a storage system, comprising the steps of: (1) providing a storage system for storing content data, content metadata, business process data, and computer executable process steps for content management and business process management; and (2) providing computer executable process steps for content management and business process management including: (i) steps for accessing the content data, the content metadata, and business process data, and (ii) steps for processing the content data in accordance with information contained in the content metadata and business process data.

The present invention also encompasses a method for providing a native, unified replication system which automatically synchronizes replication of the content data, the content metadata database, and the business process database.

Other and further objects and advantages of the present invention will be further understood and appreciated by those skilled in the art by reference to the following specification, claims, and drawings.

BRIEF DESCRIPTION OF THE DRAWINGS

Referring now to the drawings in which like reference numbers represent corresponding parts throughout.

DETAILED DESCRIPTION OF THE INVENTION

The present invention provides an integrated enterprise content management network-attached system, where a storage system is provided with native, integral content management and business process management functions. According to one aspect of the invention, the present invention is an enterprise content management network-attached system with native integration of a content management system, a business process system, and a storage system, comprising: a storage system for storing content data, content metadata, business process data, and computer executable process steps for content management and business process management, wherein the computer executable process steps for content management and business process management include: (1) steps for accessing the content data, the content metadata, and business process data, and (2) steps for processing the content data in accordance with information contained in the content metadata and business process data. According to the present invention, such enterprise content management system with native integration of a content management system, an optional business process system, and a storage system is defined as Enterprise Content Management Network-Attached System.

Figure 1:
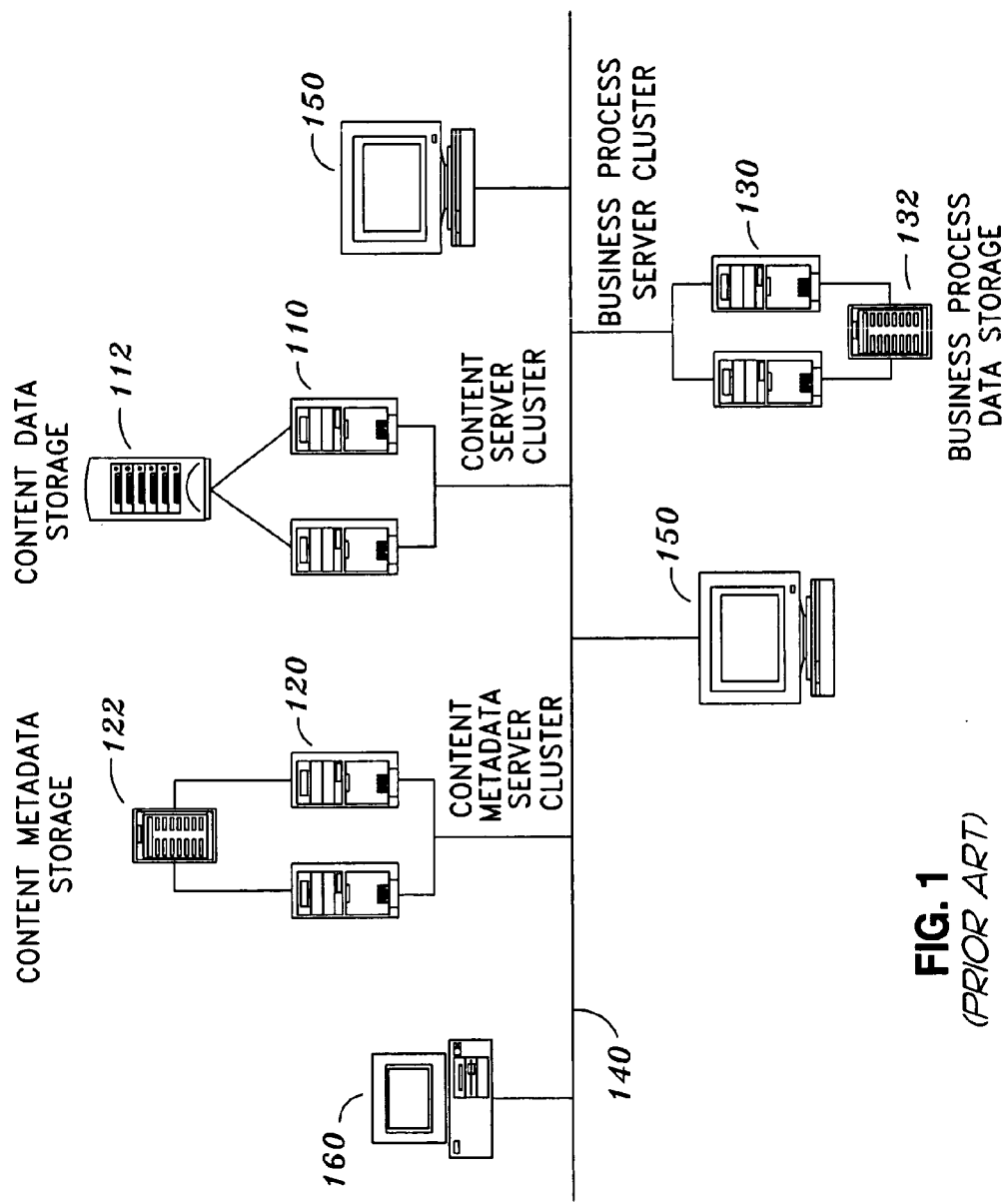
FIG. 1 illustrates a network environment in which an enterprise content management system is deployed.
Figure 2:
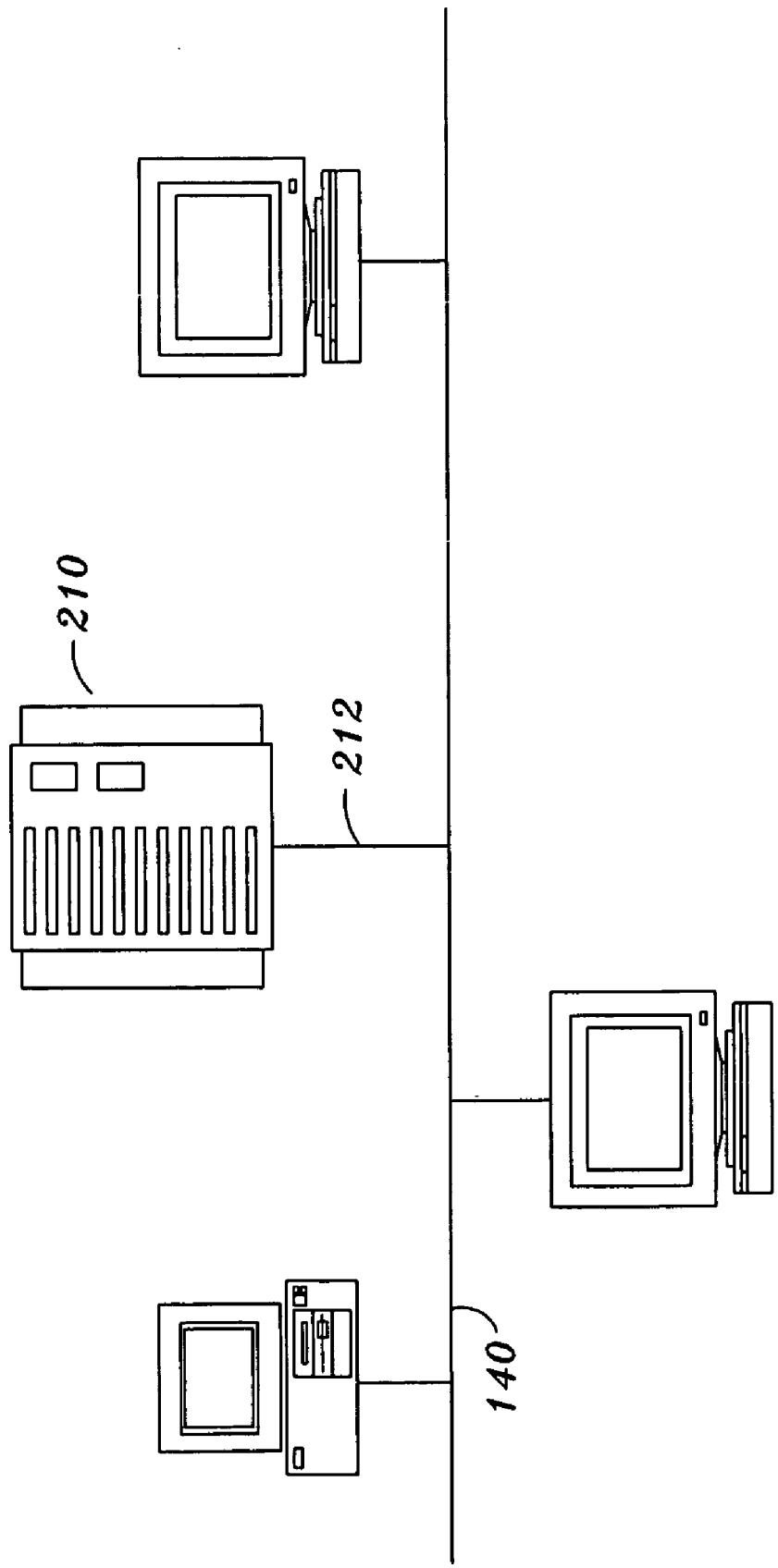
FIG. 2 illustrates Enterprise Content Management Network-Attached System deployed in a network environment according to the present invention.

FIG. 2 illustrates Enterprise Content Management Network-Attached System deployed in a network environment according to the present invention. As shown in FIG. 2, Enterprise Content Management Network-Attached System (210) is an integrated solution that provides the native, unified content data storage, content metadata storage, and business process data storage functions in "a single box". Enterprise Content Management Network-Attached System (210) is deployed by simply rolling in the "single box" and connecting it to the network (140) with network connection (212). In addition, the content management and business management functions are provided as the integral part of Enterprise Content Management Network-Attached System (210), not as separate application packages installed and operated separately from the storage system.

Figure 3:
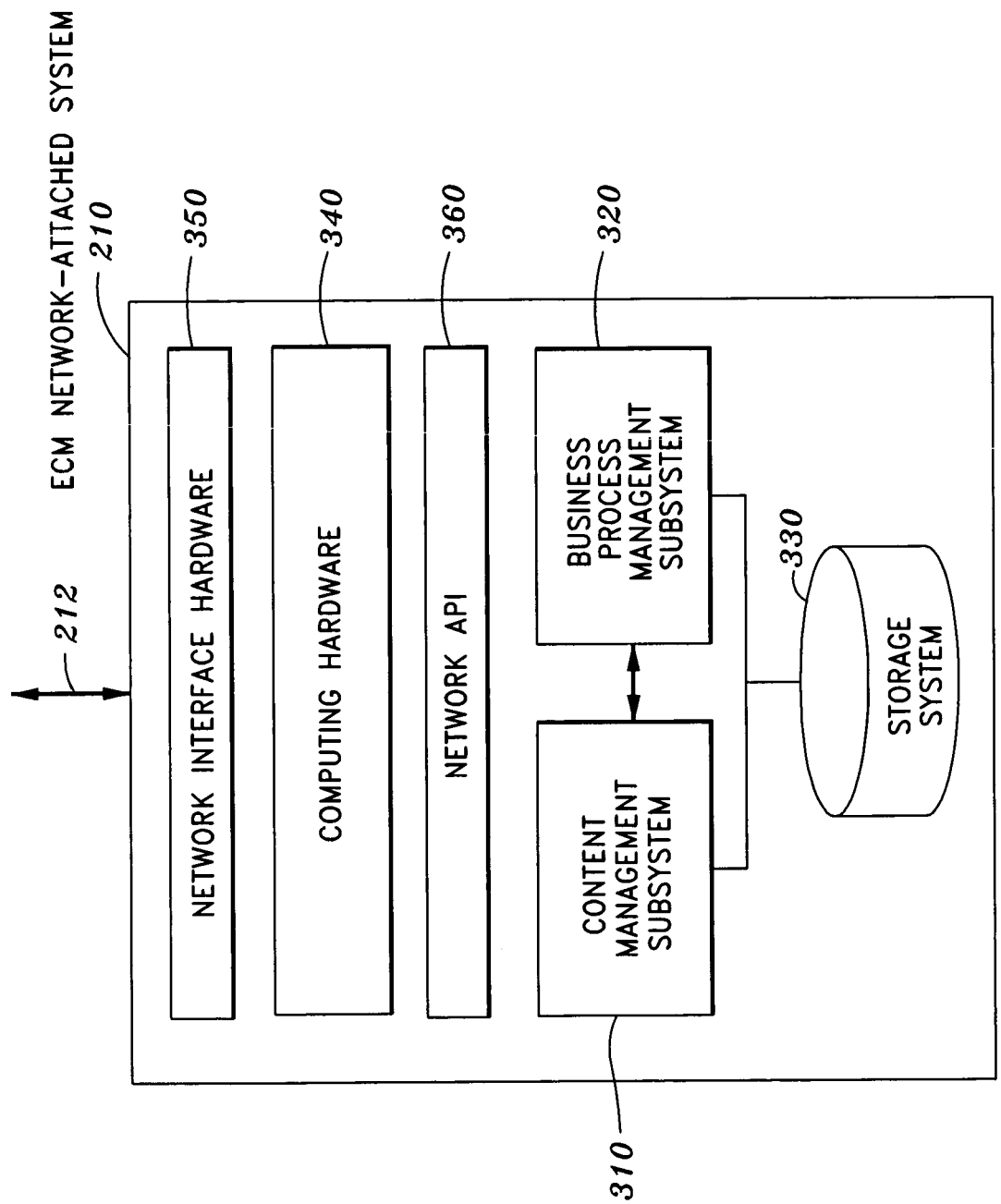
FIG. 3 illustrates the software and hardware components of Enterprise Content Management Network-Attached System according to the present invention.

FIG. 3 illustrates the software and hardware components of Enterprise Content Management Network-Attached System according to the present invention. As shown in FIG. 3, Content Management Subsystem (310), Business Process Management Subsystem (320), Storage System (330), Computing Hardware (340), and Network Interface Hardware (350) are integral part of Enterprise Content Management Network-Attached System (210) which appears as a single system to operators or end-users. The native, unified, and integrated system of the present invention eliminates the problems related to installation, configuration, and upgrade of disparate enterprise system components. The native, unified approach of the present invention also eliminates or greatly reduces the problems due to inconsistent and/or incompatible semantics across disparate systems from different vendors. In addition, the present invention also improves the overall performance of the enterprise system by providing tight integration without unnecessary interfaces or translation layers between various components of the system. The result is a more robust, reliable, and efficient enterprise content management system that is easier to deploy, configure, maintain, operate, and use.

Storage System (330) can be any storage system known to those skilled in the art, including RAID disk farm, Network Attached Storage (NAS) system, and Storage Area Networks (SAN) system, without departing from the scope of the present invention. Currently, vendors such as EMC and Network Appliance offer various NAS and SAN solutions. Storage System (330) can also include a content-addressable storage (CAS) system such as the EMC Centera™ system. For fixed-content systems, Storage System (330) can include any fixed-content storage solutions known to those skilled in the art, including the Optical Storage and Retrieval systems such as the FileNet OSAR™ system and magnetic fixed-content systems such as the EMC Centera™ system, without departing from the scope of the present invention.

Computing Hardware (340) comprises CPUs, memory units, and supporting computing circuits to provide an Enterprise Server class computing capability for Enterprise Content Management Network-Attached System (210). The CPU can be any high-performance CPU known to those skilled in the art, including an Intel CPU, a PowerPC CPU, a MIPS RISC CPU, a SPARC CPU, or a proprietary CPU, without departing from the scope of the present invention. In addition, there can be multiple CPUs for Computing Hardware (340), including scalable and/or multi-processing CPUs.

Content Management Subsystem (310) and Business Process Management Subsystem (320) can communicate with each other over any interprocess communication (IPC) mechanism known to those skilled in the art, including pipes, sockets, messages, and RPC, as well as high level communication mechanisms such as SOAP (Simple Object Access Protocol). Content Management Subsystem (310) and Business Process Management Subsystem (320) communicate with outside systems—for example, workstations (150)—over Network API (360) software and Network Interface Hardware (350) connected to network (140) over network connection (212), utilizing proprietary or standards based communications protocols including IETF WebDAV (RFC 2518) and IETF DeltaV (RFC 3253).

Figure 4:
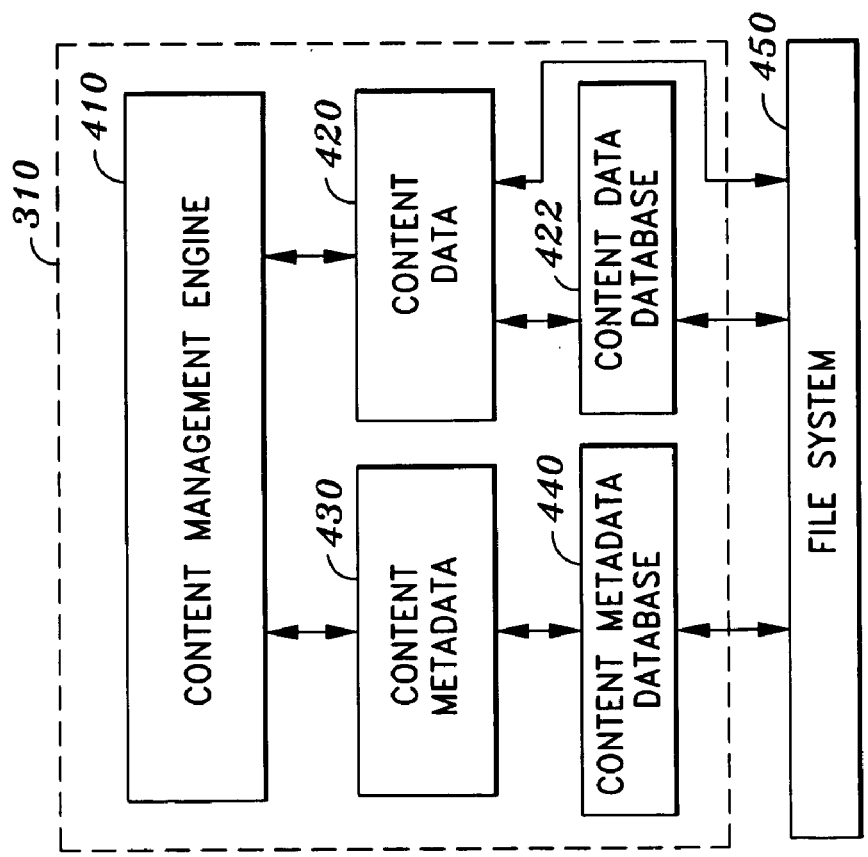
FIG. 4 illustrates the architecture of the content management subsystem according to the present invention.

FIG. 4 illustrates the architecture of the content management subsystem according to the present invention. As shown in FIG. 4, Content Management Subsystem (310) comprises Content Management Engine (410), Content Data (420), Content Data Database (422), Content Metadata (430), and Content Metadata Database (440). Content Data (420) are stored and accessed through Content Data Database (422) or File System (450) of Storage System (330), and Content Metadata (430) are stored and managed through Content Metadata Database (440) which is itself stored on Storage System (330) through File System (450).

Content Management Engine (410) contains the software logic for providing content management functions. Content Management Engine (410) comprises computer executable process steps stored on Storage System (330) that access Content Data Database (422) and Content Metadata Database (440), and process Content Data (420) in accordance with Content Metadata (430) contained in Content Metadata Database (440).

In the preferred embodiment, Content Management Engine (410) employs object-oriented (00) technology. Under this approach, a Business Object is a representation of content data and associated content metadata. A Business Object is described by a class which specifies the object properties (attributes) and the methods (functions or operations). The metadata instances of Business Objects are stored in Content Metadata Database (440), while the content data for the Business Object instances are stored either in the Content Data Database (422) or File System (450). The benefit of object-oriented technology is ease of development, management, and use through abstraction, encapsulation, and inheritance.

Figure 6:
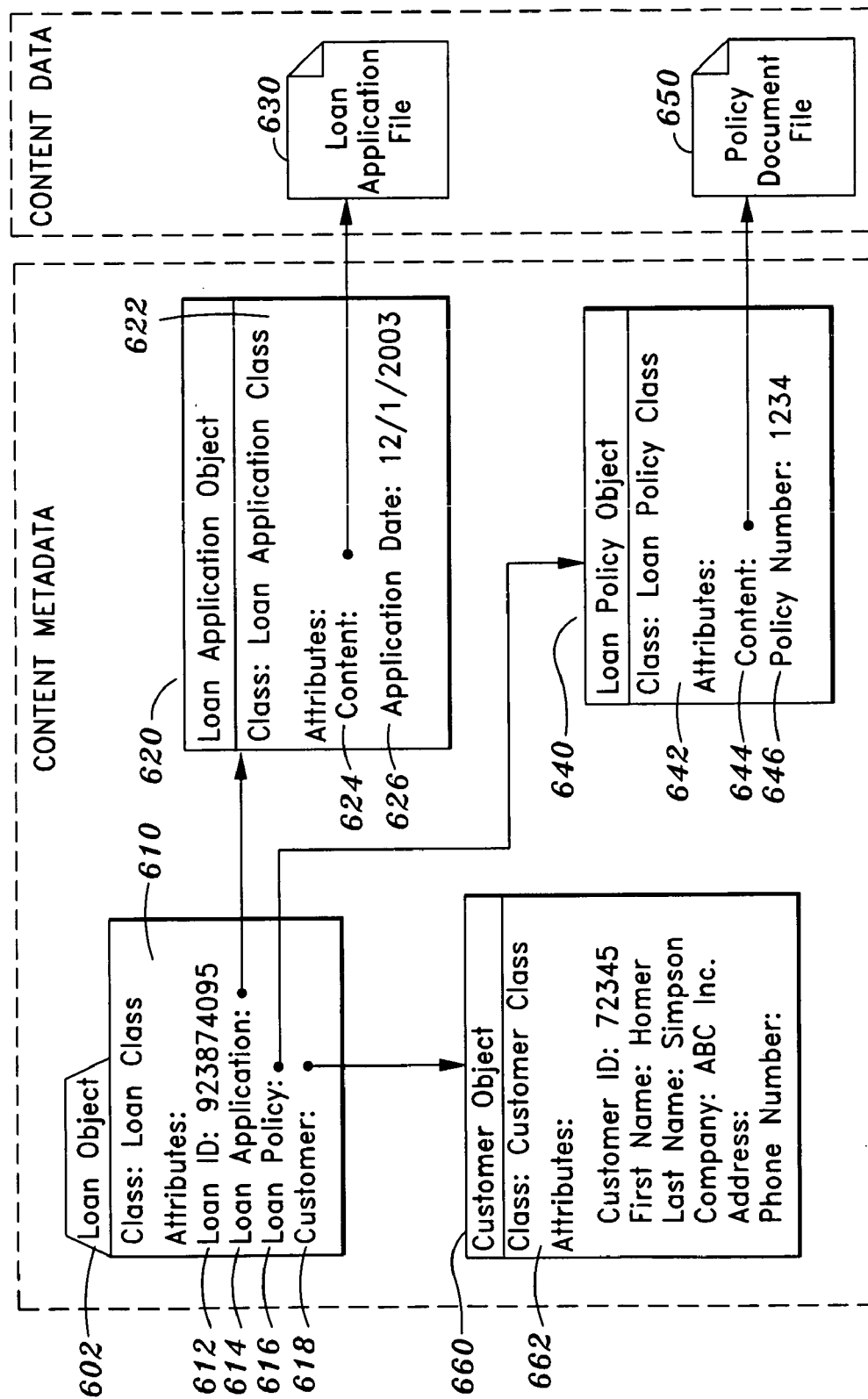
FIG. 6 illustrates an example of content management according to the present invention.

FIG. 6 illustrates an example of content management according to the present invention. As shown in FIG. 6, a Business Object for a loan is represented by Loan Object (602), which is an instance of Loan Class (610). Loan Class (610) contains Loan ID Attribute (612), Loan Application Attribute (614), Loan Policy Attribute (616), and Customer Attribute (618). Loan Application Attribute (614) can either point to or contain Loan Application Object (620), which is an instance of Loan Application Class (622). Loan Application Class (622) in turn contains Loan Application Content Attribute (624) and Application Date Attribute (626). Loan Application Content Attribute (624) points to the content data, Loan Application File (630), which can be a scanned image file of a paper application or an electronic application file.

As also shown in FIG. 6, Loan Policy Attribute (616) can either point to or contain Loan Policy Object (640), which is an instance of Loan Application Class (642). Loan Policy Class (642) in turn contains Policy Content Attribute (644) and Policy Number Attribute (646). Policy Content Attribute (644) points to the content data, Policy Document File (650), which can be an electronic document file of any type or format, including a Word document and a Acrobat document. Also shown in FIG. 6 is Customer Attribute (618) pointing to Customer Object (660), which is an instance of Customer Class (662).

The Business Objects—Loan Object (602), Loan Application Object (620), Loan Policy Object (640), and Customer Object (660)—are stored and managed through Content Metadata Database (440). Thus, Content Management Subsystem (310) of the present inventions provides services to create, search, find, sort, and manage all documents and information related to a particular loan application. For example, an end-user can search for a loan application by a particular customer by the customer name. Once the search found the match in Content Metadata Database (440), Content Management Subsystem (310) automatically provides access to all related information and documents, including Loan Application File (630) and Policy Document File (650), by utilizing various related Business Objects illustrated above. As an example, after the search, the end-user might request access to the loan application file and loan policy document for this type of loan application. In response to this service request, Content Management Subsystem (310) retrieves Loan Application File (630) by: (1) accessing Loan Application Object (620) by looking up Loan Application Attribute (614) of Loan Object (602); and (2) accessing Loan Application File (630) by looking up Loan Application Content Attribute (624) of Loan Application Object (620). Described schematically, Loan Application File (630) is accessed by the following chain of references: from Loan Object (602) to Loan Application Attribute (614), to Loan Application Object (620), to Loan Application Content Attribute (624), and to Loan Application File (630). Content Management Subsystem (310) retrieves Policy Document File (650) by a similar chain of references: from Loan Object (602), to Loan Policy Attribute (616), to Loan Policy Object (640), to Policy Content Attribute (644), and to Policy Document File (650).

Content Metadata Database (440) can be any database known to those skilled in the art, including client-server relational databases, object-oriented databases, and object-relational databases, without departing from the scope of the present invention.

Content Data (420), Content Data Database (422), Content Metadata (430), and Content Metadata Database (440) can also include full text indexing so that the entire content can be searched for text content.

Further details of content management functions are described in "FileNet Content Manager Architecture: An Architecture White Paper" by FileNet Corporation, published in 2003. The content management functions can include: capability to reliably maintain arbitrary, user specifiable, relationships between two or more content or metadata objects (to represent a compound document, for instance); capability of versioning of one or more content or metadata objects; capability to search for objects based upon metadata and content attributes, including the capability to query utilizing the XQuery or SQL query methods; capability to specify security access requirements on one or more content or metadata objects; secure authorized and audited access to content and metadata objects; and container objects each of which may contain zero or more container, content, metadata, or other objects. Examples of container objects include containers that represent folders, projects, work cases, and taxonomies.

The content management functions of the present invention can also include: capability to manually file content or metadata objects in one or more user creatable container; capability to automatically file content or metadata objects into one or more user or automatically creatable containers based on attributes of the object content or metadata or inferences of the object content or metadata; capability to store objects containing references to content stored outside of the storage system; capability to discover what metadata is required for adding new content or allowable on existing content; capability to dynamically update metadata or content without versioning or creating superfluous metadata or content objects; capability to raise events and subscription to those events by programs, scripts or other logic that users can provide to extend the behavior of the content storage system; capability to automatically change security on content or metadata objects based on time or some event; capability to provide reports about the utilization of content, metadata, and other objects including information about the eligibility of objects for replication; capability to import or export some or all of the content, metadata, or other objects stored within a content management system; and capability to pre-configure content management software and storage system capabilities so as to reduce cost of installation and minimize installation and configuration related errors.

Figure 5:
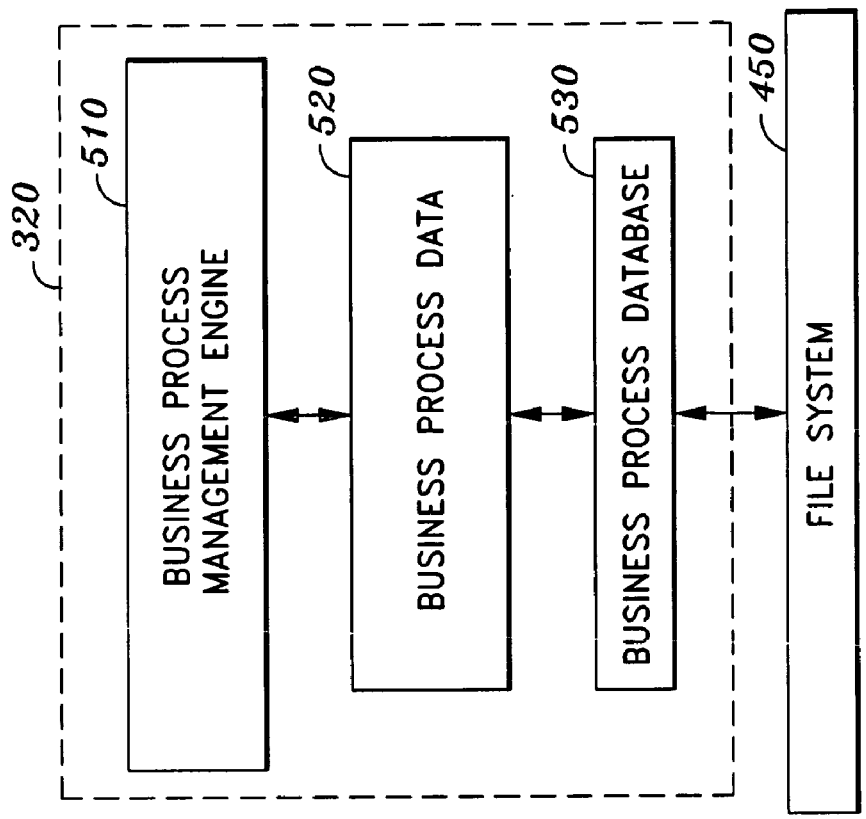
FIG. 5 illustrates the architecture of the business process management subsystem according to the present invention.

FIG. 5 illustrates the architecture of the business process management subsystem according to the present invention. As shown in FIG. 5, Business Process Management Subsystem (320) comprises Business Process Management Engine (510), Business Process Data (520), and Business Process Data Database (530). Business Process Data (520) are stored and managed through Business Process Database (530) which is stored on Storage System (330) through File System (450). Business Process Management Engine (510) contains the software logic for providing business process management functions. Business Process Management Engine (510) comprises computer executable process steps stored on Storage System (330) that access Business Process Data (520) stored in Business Process Data Database (530), and process Content Data (420) and/or Business Process Data (520) in accordance with Business Process Data (520) contained in Business Process Data Database (530).

Business Process Data Database (530) can be any network-deployable database known to those skilled in the art, including client-server relational databases, object-oriented databases, and object-relational databases, without departing from the scope of the present invention.

The details of business process management functions are disclosed in U.S. patent application Ser. No. 10/328,072, "System for Enterprise-Wide Work Flow Automation," by Luen Kimball Poindexter, Glenn R. Seidman, Stephen R. Timm, and Bruce A. Waddington, filed Dec. 23, 2002, U.S. patent application Ser. No. 09/989,833, "System for Enterprise-Wide Work Flow Automation," by Luen Kimball Poindexter, Glenn R. Seidman, Stephen R. Timm, and Bruce A.

Waddington, filed Nov. 19, 2001, and U.S. Pat. No. 6,338, 074, "System for Enterprise-Wide Work Flow Automation," by Luen Kimball Poindexter, Glenn R. Seidman, Stephen R. Timm, and Bruce A. Waddington, filed Jul. 23, 1997, the disclosures thereof are incorporated by reference herein in their entirety.

In operation, the enterprise content and business process services of the present invention are provided by Enterprise Content Management Network-Attached System (210) and accessed from workstations (150) or personal computers (160) over network (140). Upon receiving a service request from workstation (150) or personal computer (160), Enterprise Content Management Network-Attached System (210) of the present invention: 1) executes computer executable process codes that comprise Content Management Engine (410) or Business Process Management Engine (510) from Enterprise Content Management Network-Attached System (210); 2) accesses Content Data (420), Content Metadata Database (440), and Business Process Data Database (530); and 3) processes Content Data (420) in accordance with Content Metadata (430) contained in Content Metadata Database (440) and Business Process Data (520) contained in Business Process Data Database (530). The results of the processing are notified to or delivered to the requesting client workstation (150) or personal computer (160).

The Enterprise Content Management Network-Attached System of the present invention can be configured with high-availability components and capabilities—that is, with redundant components including the power supply, processor, memory, storage, and network interface controllers, controlled by a single, native high-availability (HA) software implementation that will switch to the backup components if the primary components fail. In addition, the Enterprise Content Management Network-Attached System of the present invention can include: capability to create, update, search, and delete content as part of a transaction initiated by the content management software so as to provide a system that is reliable and robust in the event of component system failures; and capability to create, update, search, and delete content and content metadata and user-definable business process as part of a transaction initiated by the calling application so as to implement a system that is reliable and robust in the event of component failures.

For mission-critical enterprise systems, it is not enough to provide high-availability capability for each of the system components. The entire system could become non-operational or go off-line due to operator error, massive system-wide failures, or natural disasters. Consequently, mission-critical enterprise systems are usually backed up by disaster recovery systems at an off-site facility away from the operation or production deployment site. For desaster recovery systems, a key issue is consistent and reliable replication of relevant data from the operation site (called production site) to disaster recovery site, since the disaster recovery site must contain a current or nearly current set of data for the backup system to be effective. For existing enterprise disaster recovery solutions, providing consistent and reliable replication is a difficult and error-prone process.

Figure 7:
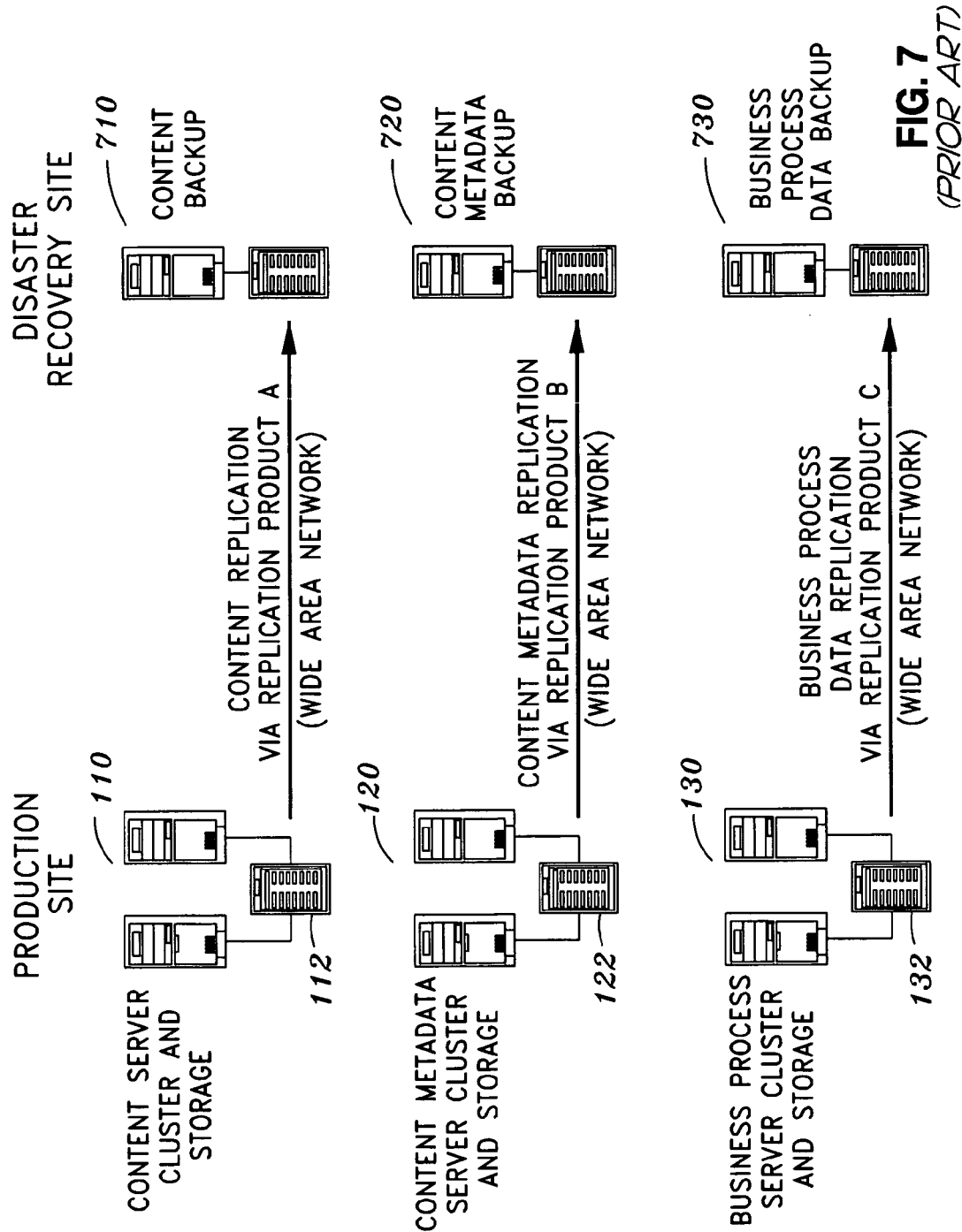
FIG. 7 illustrates the high-availability and disaster recovery configurations of the existing content management and business process management systems.

FIG. 7 illustrates the high-availability and disaster recovery configurations of typical existing content management and business process management systems. As shown in FIG. 7, in the existing products, content, content metadata, and business process data are replicated separately by different products through disparate processes. Content data are replicated from Content Server Cluster (110) and Content Data Storage (112) to Content Backup (710) via replication product A, content metadata from Content Metadata Server Cluster (120) and Content Metadata Storage (122) to Content Metadata Backup (720) via replication product B, and business process data from Business Process Server Cluster (130) and Business Process Data Storage (132) to Business Process Data Backup (730) via replication product C. Because content, content metadata, and business process data are replicated separately by different mechanisms on different schedules, the replication process can leave the recovery system with inconsistent data. Content data items may be there but their metadata are not, or business process data may include references to content item or metadata values that are not yet replicated to the recovery site.

Figure 8:
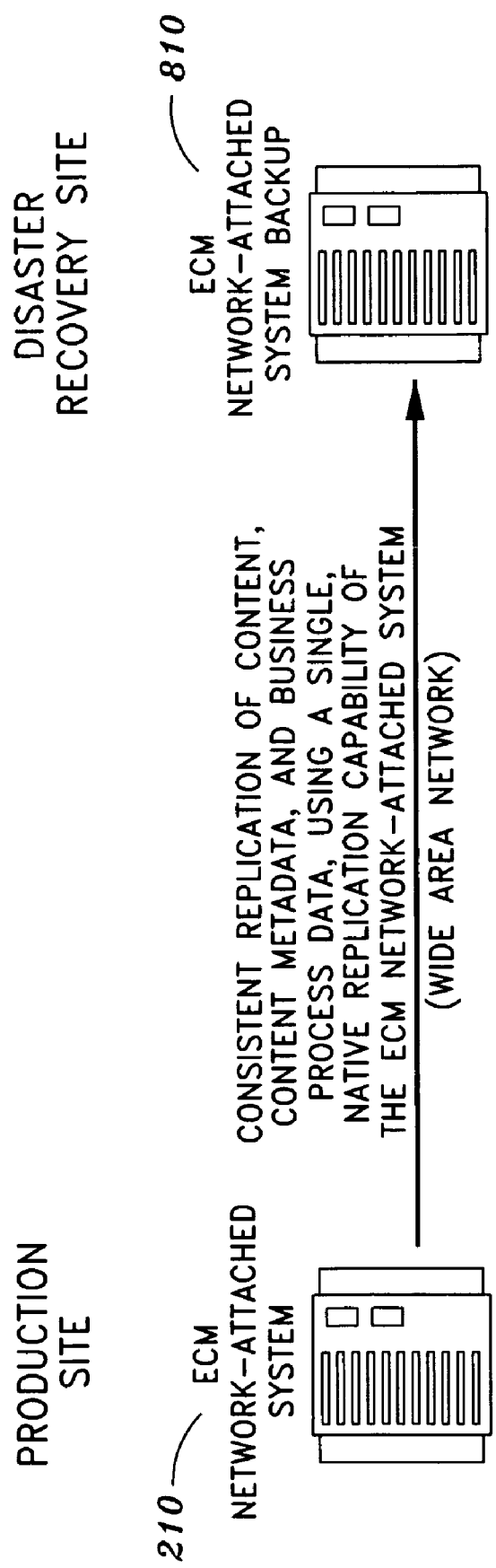
FIG. 8 illustrates the integrated high-availability and disaster recovery configurations according to the present invention.

The present invention eliminates the need for synchronization and coordination of replication operations of disparate systems and the related problems by providing a unified, native replication facility from a single storage system. FIG. 8 illustrates the integrated high-availability and disaster recovery configurations according to the present invention. As shown in FIG. 8 Enterprise Content Management Network-Attached System (210) is replicated as a single system to Enterprise Content Management Network-Attached System Backup (810), utilizing a single, unified, native replication facility of the system, providing consistent and logically ordered replication of content, content metadata, and business process data. Because Content Data (420), Content Metadata (430), Content Metadata Database (440), Business Process Data (520), Business Process Data Database (530), and File System (450) of Storage System (330) are all integral part of Enterprise Content Management Network-Attached System (210), a single, unified, native replication facility can replicate the entire content of the system more efficiently using a single consistent mechanism, eliminating the need to coordinate replication and synchronize replicated content.

Furthermore, the single, unified, native replication facility of the present invention can guarantee zero-loss replication across all levels of replication, including the disk I/O level, the file system level, and the transaction level. At the disk I/O or storage level, the replication facility of the present invention can guarantee zero-loss replication by not returning from the replication operation—that is, performing a synchronous replication operation—until the disk sector or sectors being replicated has been committed to the recovery site. Similarly, at the file system level, zero-loss replication is guaranteed by not returning from the replication operation until the entire file has been committed to the recovery site. Finally, at the transaction level, zero-loss replication is guaranteed by committing the transaction at both production and recovery sites—i.e., completing the transaction guarantees that the entire set of files comprising the transaction have been committed to both the production site and the recovery site.

In operation, replication can take place continuously (or in "real-time") as the disk sectors, files, or set of files are modified and updated. Thus, as the production system content is being changed by enterprise operations, the production system is transparently mirrored to the recovery site in "real-time" with zero-loss guaranteed across all levels of replication, including the disk I/O level, the file system level, and the transaction level.

Replication operation can also be scheduled to run automatically at a pre-determined time when the impact of backup operation on the overall system perfomance is minimal. Alternatively, replication can be initiated manually at any given time.

When replication is not continuous, ECM Network-Attached System (210) keeps a logically ordered record of the data changes since the last replication. This record represents the delta between the data as of the last replication and the current state. It could be organized by data change operations at the storage level, the file system level, the transaction level, or any other level that allows tracking the logical order of operations and replicating that order at the recovery site. Typically, only the difference delta data are replicated to save replication time and reduce impact on the overall system. Alternatively, the entire data set can be replicated, although this is usually done only during the initial (or the very first) system replication. Once the replication system has determined the delta data set, the data are read from Storage System (330) in the recorded logical order and transmitted in that same logical order to Enterprise Content Management Network-Attached System Backup (810) over a network connection. Because the replication of the entire system data set—Content Data (420), Content Metadata (430), Content Metadata Database (440), Business Process Data (520), and Business Process Data Database (530)—is accomplished through one integrated mechanism, the replication is synchronized automatically, and the need for manual accounting of the synchronization of replicated data is eliminated by the present invention.

Moreover, system administrators only need to learn and administer a single technology for replication and a single implementation for high availability. This reduces the likelihood of operator errors that would lead to downtime or failure of the recovery system in a disaster.

The advantages of the present invention ultimately result in a complete enterprise content and business process management system with a lower total cost of ownership (TCO) than the systems with a combination of software and storage systems.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. An enterprise content management network-attached system with native integration of a content management system, a process management system and a storage system, comprising:

the storage system configured to store content data, content metadata, process data, and configured to store computer executable steps to perform content management and process management,
wherein the storage system comprises a fixed content storage system,
means for accessing the content data, the content metadata and the process data,
means for processing the content data in accordance with information contained in the content metadata and the process data,
means for outputting results from executing the process steps for processing the content data, and
a native and unified replication system configured to replicate the content data, the content metadata and the process data,
wherein the replicated content data, the content metadata and the process data is automatically synchronized.

2. The enterprise content management network-attached system of claim 1, wherein the storage system comprises a Storage Area Network (SAN) system.

3. The enterprise content management network-attached system of claim 1, wherein the storage system comprises a Network Attached Storage (NAS) system.

4. The enterprise content management network-attached system of claim 1, wherein the storage system comprises a Content Addressable Storage (CAS) system.

5. A method of providing services in an enterprise content management network-attached system with native integration of a content management system, a process management system and a storage system, comprising the steps of:

providing the storage system for storing content data, content metadata, process data, and computer executable process steps configured to perform content management and process management,
wherein the storage system comprises a fixed content storage system;
providing computer executable process steps for content management and process management including:
(1) steps for accessing the content data, the content metadata and the process data, and
(2) steps for processing the content data in accordance with information contained in the content metadata and the process data,
wherein, upon execution of the computer executable process steps, results from the steps for processing the content data are output to a requesting computer,
providing a native and unified replication system configured to replicate the content data, the content metadata and the process data,
wherein the replicated content data, the content metadata and the process data is automatically synchronized.

6. The method of claim 5, wherein, in the step of providing the storage system, the storage system comprises a Storage Area Network (SAN) system.

7. The method of claim 5, wherein, in the step of providing the storage system, the storage system comprises a Network Attached Storage (NAS) system.

8. The method of claim 5, wherein, in the step of providing the storage system, the storage system comprises a Content Addressable Storage (CAS) system.

* * * * *